(12) United States Patent
Altshuler et al.

(10) Patent No.: US 10,794,732 B2
(45) Date of Patent: Oct. 6, 2020

(54) APPARATUS, SYSTEM AND METHOD FOR CORRECTING NONUNIFORM ROTATIONAL DISTORTION IN AN IMAGE COMPRISING AT LEAST TWO STATIONARY LIGHT TRANSMITTED FIBERS WITH PREDETERMINED POSITION RELATIVE TO AN AXIS OF ROTATION OF AT LEAST ONE ROTATING FIBER

(71) Applicant: Canon U.S.A., Inc., Melville, NY (US)

(72) Inventors: Alexander Altshuler, Cambridge, MA (US); Jacob Schieffelin Brauer, Cambridge, MA (US); Anderson Thi Mach, Boston, MA (US)

(73) Assignee: Canon U.S.A., Inc., Melville, NY (US)

( * ) Notice: Subject to any disclaimer, the term of this patent is extended or adjusted under 35 U.S.C. 154(b) by 180 days.

(21) Appl. No.: 16/184,646

(22) Filed: Nov. 8, 2018

(65) Prior Publication Data

US 2020/0149929 A1 May 14, 2020

(51) Int. Cl.
*G01N 21/47* (2006.01)
*G01D 5/30* (2006.01)
(Continued)

(52) U.S. Cl.
CPC .............. *G01D 5/30* (2013.01); *G06T 5/006* (2013.01); *G06T 7/70* (2017.01)

(58) Field of Classification Search
CPC ..... A61B 5/0084; A61B 8/445; A61B 5/0035; A61B 5/0066; A61B 8/4461; G01N 21/474; G02B 6/3604; G01D 5/34723
(Continued)

(56) References Cited

U.S. PATENT DOCUMENTS 6,019,726 A 2/2000 Webb
6,054,938 A 4/2000 Nakajima et al.
(Continued)

FOREIGN PATENT DOCUMENTS

EP 908849 A1 4/1999
EP 2415390 A1 2/2012
(Continued)

OTHER PUBLICATIONS

Zeidan, A., et al, "Spectral imaging using forward-viewing spectrally encoded endoscopy", Biomedical Optics Express, Feb. 1, 2016, pp. 392-398, vol. 7, No. 2.
(Continued)

*Primary Examiner* — Que Tan Le
(74) *Attorney, Agent, or Firm* — Canon U.S.A., Inc. IP Division

(57) ABSTRACT

An image processing apparatus and method for detecting a position of a rotating optical fiber is provided. The apparatus includes at least one rotating optical fiber that rotates about an axis of rotation and that emits light towards a surface and at least two stationary fibers for transmitting light reflected from a surface, each of the at least two stationary fibers having a known predetermined position relative to each other and to the axis of rotation of the at least one rotating optical fiber. At least one detector is configured to detect an intensity of light transmitted through each of the at least two stationary fibers within a given time interval and at least one calculator is configured to use the detected intensities and the known predetermined positions of each of the at least two stationary fibers to determine a relative angular position of the rotating optical fiber with respect to the at least two stationary fibers.

21 Claims, 10 Drawing Sheets

(51) Int. Cl.
*G06T 5/00* (2006.01)
*G06T 7/70* (2017.01)

(58) Field of Classification Search
USPC .................................... 250/227.14, 227.11
See application file for complete search history.

(56) References Cited

U.S. PATENT DOCUMENTS

| | | | |
|---|---|---|---|
| 6,654,630 B2* | 11/2003 | Zuluaga | A61B 5/0084 |
| | | | 600/407 |
| 8,414,496 B2 | 4/2013 | Goodnow et al. | |
| 8,928,889 B2 | 1/2015 | Tearney et al. | |
| 9,039,626 B2 | 5/2015 | Courtney | |
| 9,254,089 B2 | 2/2016 | Tearney et al. | |
| 9,846,940 B1 | 12/2017 | Wang | |
| 2004/0222987 A1 | 11/2004 | Chang et al. | |
| 2006/0017720 A1 | 1/2006 | Li | |
| 2006/0054783 A1 | 3/2006 | Voronov et al. | |
| 2008/0123911 A1 | 5/2008 | Lam et al. | |
| 2008/0298685 A1 | 12/2008 | Maeda | |
| 2009/0018393 A1 | 1/2009 | Dick et al. | |
| 2012/0101374 A1 | 4/2012 | Tearney et al. | |
| 2012/0190928 A1 | 7/2012 | Boudoux | |
| 2013/0079644 A1 | 3/2013 | Peeters Weem et al. | |
| 2013/0093867 A1 | 4/2013 | Schick | |
| 2013/0188009 A1 | 7/2013 | Wagatsuma | |

FOREIGN PATENT DOCUMENTS

| | | |
|---|---|---|
| JP | 2008304541 A1 | 12/2008 |
| WO | 2002/38040 A2 | 5/2002 |
| WO | 2014147039 A1 | 9/2014 |
| WO | 2015/116939 A1 | 8/2015 |

OTHER PUBLICATIONS

Zeidan, A., et al, "Miniature forward-viewing spectrally encoded endoscopic probe", Optics Letters, Aug. 15, 2014, pp. 4871-4874, vol. 39, No. 16.

Park, H., et al., "Forward imaging OCT endoscopic catheter based on MEMS lens scanning", Optics Letters, Jul. 1, 2012, vol. 37, No. 13.

Kang, D., et al., "Spectrally-encoded color imaging", Optics Express, Aug. 17, 2009, pp. 15239-15247, vol. 17, No. 17.

Penne, J. et al., "Time-of-Flight 3-D Endoscopy", 12th International Conference, London, UK, Sep. 20-24, 2009, pp. 467-474, vol. 5761.

Ahsen, O., et al, "Correction of rotational distortion for catheter-based en face OCT and OCT angiography", Opt. Lett, Oct. 15, 2014, pp. 5973-5976, vol. 39, No. 20.

Kang, W., et al., "Motion artifacts associated with in vivo endoscopic OCT images of the esophagus", Opt Express, Oct. 10, 2011, pp. 20722-20735, vol. 19, No. 21.

* cited by examiner

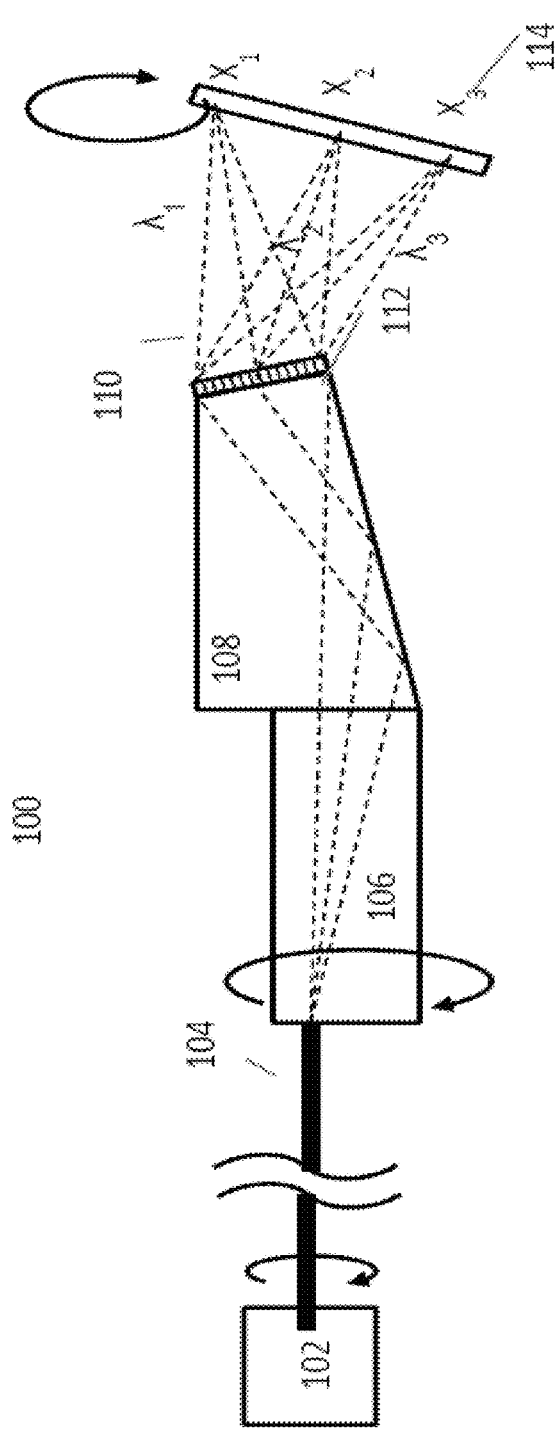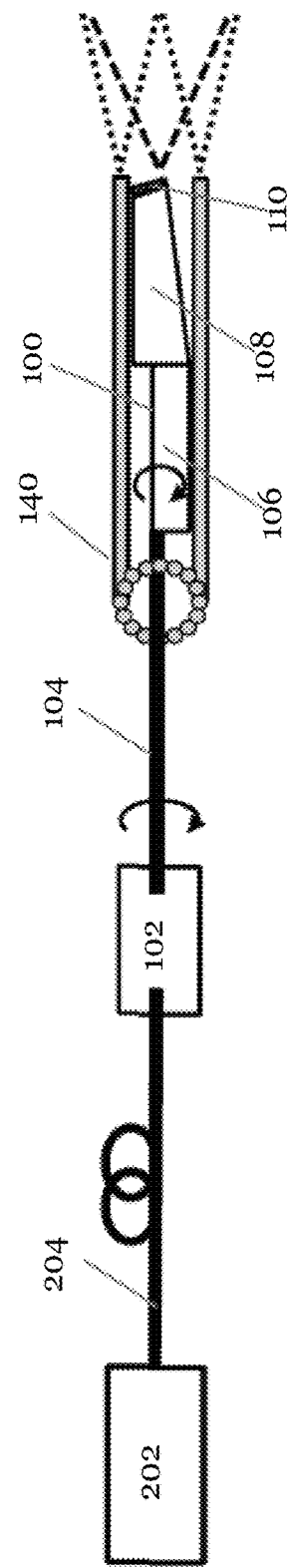
FIG. 1A
FIG. 1B

APPARATUS, SYSTEM AND METHOD FOR CORRECTING NONUNIFORM ROTATIONAL DISTORTION IN AN IMAGE COMPRISING AT LEAST TWO STATIONARY LIGHT TRANSMITTED FIBERS WITH PREDETERMINED POSITION RELATIVE TO AN AXIS OF ROTATION OF AT LEAST ONE ROTATING FIBER

BACKGROUND

Field of Art

The present disclosure relates to image processing techniques. More specifically, the disclosure exemplifies techniques for correcting irregularities in an image caused by nonuniform rotational distortions.

Description of the Related Art

Medical probes have the ability to provide images from inside the patient's body. One useful medical probe employs spectrally encoded endoscopy ("SEE") technology, which is a miniature endoscopy technology that can conduct high-definition imaging through a sub-mm diameter probe. SEE uses wavelength to encode spatial information of a sample, thereby allowing high-resolution imaging to be conducted through small diameter endoscopic probes. SEE can be accomplished using broad bandwidth light input into one or more optical fibers. At the distal end of the fiber, a diffractive or dispersive optical component disperses the light across the sample, which returns back through the optic and then through optical fibers. Light is detected by a wavelength detecting apparatus, such as a spectrometer where each resolvable wavelength corresponds to reflectance from a different point on the sample.

A common way for capturing these images involves scanning a surface of an object with an optical beam being emitted from an optical fiber which is rotated. Conventionally this rotation makes use of a flexible torque transmitting shaft to rotate the optical fiber. A drawback associated with this rotation of the optical fiber occurs when an amount of friction changes between the rotating fiber and the sheath that encloses the optical fiber. This change in friction causes an uneven rotation speed which presents itself in the captured image as an irregularity. This irregularity is known as nonuniform rotational distortion (NURD) and causes the captured image to be blurred which can negatively impact the ability to interpret the image. This negative impact of this irregularity is particularly relevant in the medical imaging field where it is of paramount importance to capture a high quality image that can successfully be used in a diagnostic capacity.

There have been attempts to resolve irregularities caused by NURD. However, these solutions have their own drawbacks associated therewith. One such solution to correct for NURD is to use a specially made catheter sheath that has a nonuniform wall thickness to attempt to provide angular position information. However, this ability to successfully correct for NURD in this manner is specifically dependent on the accuracy of the sheath extrusion process. Moreover, this introduces additional design requirements and costs to any probe that uses the specially designed sheath. Another option for correcting for NURD irregularities is to provide a specific optical encoder at the distal end of the optical fiber that can estimate rotational velocity of the optical fiber. One such compensation processing technique is an analog technique that counts gray levels in prior frames. The goal of this analog model attempts to address real or near real time processing using minimal image buffers. In this technique, the gray levels of a first frame are counted to obtain a probability distribution of gray levels simultaneously when the first frame is inputted into a source driver of an LCD. A first set of gamma reference voltages is generated according to the probability distribution of gray levels and is supplied to the source driver for the gamma correction for a second frame when the second frame is inputted into the source driver. The loop is repeated when the second frame is input into the source driver and the gray levels of the second frame are counted to obtain a probability distribution of gray levels and to generate a second set of gamma reference voltages for the gamma correction of the third frame. In short, this technique keeps the most recent three or four frames of image data to obtain a distribution of the compensation applied to the most recent frame. The compensation applied to the most recent previous frame is applied to a current frame to determine if a difference between compensation values applied meets a predetermined threshold. If the calculated difference is beneath the threshold, then the compensation value applied to the previous frame is applied to the current frame. However, if the value meets or exceeds the threshold, an entirely new compensation value is calculated for use on the current frame.

A drawback associated with exemplary image correction and normalization techniques relates to the intensity of the calculations needed to derive compensation values. Further, these calculations are not as successful in high frame rate applications such as medical imaging using a SEE endoscope. What is needed is a technique for in-line spectrum image compensation that is usable in a high frame rate environment that overcomes these deficiencies of past systems.

SUMMARY

Accordingly, it can be beneficial to address and/or overcome at least some of the deficiencies indicated herein above, and thus to provide compensation algorithm that corrects image data for real-time display thereof.

In one embodiment, an image processing apparatus for detecting a position of a rotating optical fiber is provided. The apparatus includes at least one rotating optical fiber that rotates about an axis of rotation and that emits light towards a surface and at least two stationary fibers for transmitting light reflected from a surface, each of the at least two stationary fibers having a known predetermined position relative to each other and to the axis of rotation of the at least one rotating optical fiber. At least one detector is configured to detect an intensity of light transmitted through each of the at least two stationary fibers within a given time interval and at least one calculator is configured to use the detected intensities and the known predetermined positions of each of the at least two stationary fibers to determine a relative angular position of the rotating optical fiber with respect to the at least two stationary fibers.

In another embodiment, a method of detecting a position of a rotating optical fiber that rotates about an axis of rotation and that emits light toward a surface is provided. The method includes detecting an intensity of light reflected from the surface and which is transmitted through at least two stationary fibers within a given time interval, wherein each of the at least two stationary fibers have a known predetermined position relative to each other and to the axis of rotation of the at least one rotating optical fiber and using the detected intensities and the known predetermined positions of each of the at least two stationary fibers to determine a relative angular position of the rotating optical fiber with respect to the at least two stationary fibers.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

FIGS. 1A-1C are diagrams of embodiments showing illumination optics.

Figure 1C:
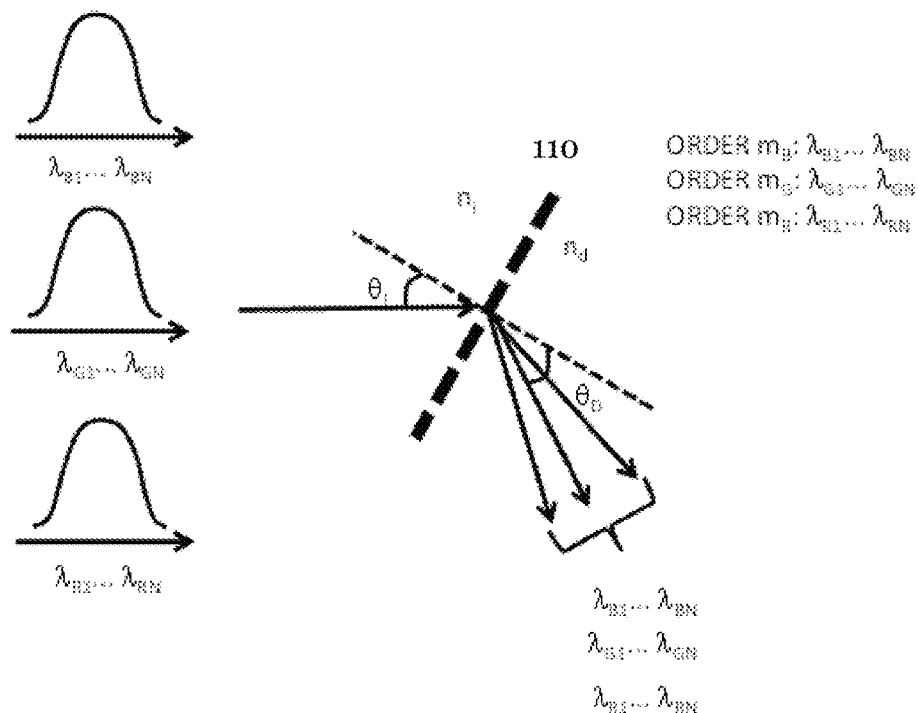

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

According to the present disclosure an image processing system and method are provided. The image processing system and method advantageously improves, on a frame-by-frame basis, one or more images that have been captured by an image capturing apparatus for display on display device. The image processing system according to invention principles executes one or more nonuniform rotational distortion (NURD) correction algorithms that are applied in real-time to obtain positional information about the rotating optical fiber within a sheath. The position information obtained by the algorithm can then be used to correct the captured image data in order to improve image quality by reducing NURD to produce a clear image that better represents the surface being imaged. A NURD correction algorithm advantageously uses light intensity captured by at least one light detection fiber that surrounds the rotating optical fiber relative to at least one other detection fiber in order to identify the position of the rotating optics within the sheath. Because the angular information of each detection fiber is known and unchanged, a detection fiber that captures light with a higher intensity (e.g. greater power value) relative to the adjacent detection fiber can be fit to a curve in order to identify a maximum value and angular information between the particular fiber having the maximum intensity value at a given time relative to other detection fibers can be obtained and used in the NURD correction algorithm to correct the captured images. In doing so, a NURD correction algorithm according to invention principles reduces the cost and complexity of spectral imaging probes because NURD correction can be performed using only the components of the imaging probe as designed and with reduced computational requirements which improves the speed and accuracy of both capturing and outputting of the image to be used in a diagnostic capacity.

Illumination in a forward-view spectrally encoded endoscopic system may be done in one of several ways. For example, as shown in the embodiment of FIG. 1A, light, after exiting a fiber rotary junction 102 is sent through an optical fiber 104. Light then enters a light focusing component such as a GRIN lens 106 which is rotated by the fiber rotary junction 102. Light then passes through a spacer element 108 which directs light to a grating 110 after reflecting off a mirrored surface 112 of the spacer element 108. The grating 110 separates the light into the various wavelengths which are directed to a sample 114, where the various excitation wavelengths ($\lambda_1$, $\lambda_2$, and $\lambda_3$) imping on the sample at locations $X_1$, $X_2$, and $X_3$. As the rotary junction 102 rotates the probe, the light on the sample also rotates, where light at position $X_1$ makes a small diameter ring on the sample 114 and light at position $X_3$ makes a ring having a larger diameter. While there may be a small area in the exact center of the sample 114, this probe allows for forward viewing. Other excitation optics may also be used. For example, the illumination optics described in WO 2015/116951, which is herein incorporated by reference, may be used.

In some embodiments, the illumination element provides light to an imaging surface or sample in a forward view configuration. Particularly, at least one diffracted light propagates from the grating component of the illumination element substantially along the probes optical axis, where the probe optical axis is the axis extending along the direction of propagation of a light provided from the light guiding component through the light focusing component. In some embodiments, the illumination element is configured such that, from the proximal end, a light from a broadband source will propagate from the light guiding component, through the light focusing component, off an optional light reflecting component, and then through or off the first dispersive component and onto a sample. The sample may be an in vivo sample, such as a tissue or organ.

Light reflected from the surface or sample can be collected or detected by one or more stationary optical fibers surrounding the illumination element. The terms imaging surface, surface, and/or tissue may be used interchangeably. Thus, the one or more stationary optical fibers do not rotate. In one embodiment, the one or more stationary optical fibers are detection fibers that collect and/or detect light reflected from the surface such as tissue. In another embodiment, the one or more stationary fibers are multimode fibers which may perform at least two functions, one of which is collecting light reflected from the surface. Having more than one detection fiber and the fiber being multimode fiber has the advantage of increasing the light collection. More detection fiber enables greater light collection. The multimode has larger core and will be advantageous in detection light coupling. For example, there may be 2, 3, 4, 5, 6, 7, 8, 9, 10, 11, 12, 13, 14, 15, 16, 17, 18, 19, 20, 21, 22, 23, 24, or more detection fibers. A greater number of detection fibers is advantageous in that this provides greater signal input into the detector and can also be used to reduce speckle noise. In some embodiments, and as shown in FIG. 1B, the detection fibers 140 may be packed closely in the ring around the illumination element 100. In some embodiments, cladding around the distal end of the detection fibers is removed to increase the packing density of the detection fibers around the illumination element. Thus, the outer diameter of the illumination element including any protective cladding not removed, limits the number of detection fibers that can form a fiber ring. For example, with a 50 µm tubing wall thickness for the illumination element, and 145 µm detection fiber diameter (including cladding), with a 6 µm tolerance, there can be 18 fibers surrounding the ring. For 185 µm detection fiber diameter (including cladding), with a 20 µm tolerance, there can be 14 fibers surrounding the ring. For the same detection fibers but with a 100 µm tubing wall thickness for the illumination element, there can be 20 and 15 fibers, respectively. In some embodiments, there may be two or three rows of rings around the illumination element. While this increases the total diameter, it has the advantage of increasing signal input to the detector and allows for a broader range of fibers to be used.

Having more than one detection fiber will help in reducing speckles from the image because the detection fibers will be arranged at different position with respect to the illumination fiber, such that they collect light from the same point on the object with different optical path lengths. By separating multiple detection fibers apart as much as possible (but within the parameters needed for a small diameter probe), the speckle reduction effect will increase.

The light collecting components, which are exemplified as stationary optical fibers (detection fibers) at least partially surround the illumination element. On way to separate the multiple detection fibers apart as much as possible and still work within the constraints of a cylindrical outer sheath is to prove the multiple detection fibers in a ring around the illumination element that may remain stationary as the illumination element is rotated. An exemplary depiction of this arrangement will be discussed hereinafter in greater detail with respect to FIGS. 3A and 3B. In one embodiment, the detection fibers completely surround the illumination element 100 and form a fiber ring. In other embodiments, several fibers may be equally spaced around the illumination element 100 to form the plurality of light collecting components. In other embodiments, the plurality of detection fibers mostly surround the illumination element 100, but have a space or a channel(s). This space can be used, for example, for one or more endoscopic tool(s). In other embodiments, the optical fibers will not be equally spaced or have an asymmetrical distribution around the illumination element. In other embodiments, the asymmetric distribution of optical fibers and the illumination element 100 allow for a larger tool or fluid channel to be incorporated into the endoscopic system.

FIG. 1B demonstrates the forward view SEE optics. In this embodiment, a broadband source 202 provides light radiation from about 420 nm to 820 nm. However, in other embodiments, other ranges, particularly those in the UV, visible, and IR may be used. In other embodiments, multiple radiation bands may be provided in one or more fibers to provide color SEE. A fiber 204 connects the broadband source 202 to the fiber rotary junction 102. Light then goes through an optical fiber 104, a light focusing component 106 and then a spacer element 108 which has a grating 110 on the distal surface. Also shown is the collection optics that includes multiple detection fibers forming a fiber ring 140 that circle the collection optical elements. This embodiment shows 16 multi-mode optical fibers 140 that cover the entire field of view of the illumination optics, where the detection fibers 140 form a ring around the excitation optics part of the probe 100. This number of fibers described herein is for purposes of example only and should not be construed as limiting. There may be any number of detection fibers used various embodiments. The fiber ring 140 may optionally be encased or surrounded by an outer sheath (not shown) to protect the detection optics. This may be formed, for example, by using heat shrink tubing.

In some embodiments, the SEE probe is a side view SEE probe. The optical configuration to form a side view probe are described, for example, in PCT Application WO 2017/117203. In some embodiments, color SEE may be obtained by combining several bands of light. One method of color SEE is illustrated by FIG. 1C. The blue band of light ($\lambda_{B1}$ to $\lambda_{BN}$), the green band of light ($\lambda_{G1}$ to $\lambda_{GN}$), and red band of light ($\lambda_{R1}$ to $\lambda_{RN}$) are incident on the grating 110 at substantially the same incident angle $\theta_i$. In order to make the blue band of illumination light, green band of illumination light, and red band of illumination light overlap on the sample 200, the diffraction orders for the three bands of light are restricted such that the light of 3 wavelengths ($\lambda_{BX}$, $\lambda_{GX}$, $\lambda_{RX}$) in which X is an integer from 1 to N representing the wavelengths in the blue, green and red wavelength bands are all incident on the grating 110 at substantially the same angle $\theta_i$ and are all diffracted at substantially the same angle $\theta_d$. After illumination of the diffracted light (e.g., red, green, and blue light) on the sample 200 (e.g., a tissue or in vivo sample), light is reflected, scattered, photoluminescence by the sample 200. This light is collected by the detection fiber 140, detected, and sent to an image processor which creates a color image. Color SEE as described in U.S. Pat. Pub. 2018/0017778 is hereby incorporated by reference in its entirety.

As shown herein in FIGS. 1A-1C, the collected light is delivered to the spectrometer 142 via the detection fiber 140. The spectrometer 142 obtains 1D spectral data for the spectrally dispersed wavelength band, or for the case of color SEE, the multiple wavelength bands (e.g., blue, green, and red light). The reference to detection fiber 140 being singular should not be construed as limiting to a single detection fiber 140. Instead, it should be understood that reference to detection fiber 140 may include one or more individual detection fibers positioned around the illumination fiber 112 such that, upon rotation of the illumination fiber about an axis of rotation, the one or more detection fibers arranged therearound can detect light reflected by a surface of the sample.

The probe is rotated around the optical axis of rotation by a motor as indicated by the arrow such that illumination light lines scan the sample, and 2D data (wavelength and time) may be obtained by the spectrometer 142. The motor can be, for example, a Galvano motor, stepping motor, a piezo-electric motor, or a DC motor. A rotary junction may be used for rotation of the probe. For example, by rotating the spectrally encoded lines in the direction of the arrow, a circular region can be imaged. At the spectrometer 142, the wavelength of the collected light can be read out, which can be used to generate a line image of the sample.

After the spectrometer and one or more detectors (or detection means) detects the collected light, an image processor 150 generates a 2D image from the data. In other embodiments, two, four, or more 2D images are formed using a probe with appropriate overlapping orders of diffracted light to form a color image. Because the rotation speed of the rotary junction is known, the image processor uses the position information for the non-spectrally encoded dimension. However, without further processing, NURD may be an issue in the images.

In one embodiment, the image processor 150 is a calculator or calculation means that includes analog circuitry or digital circuitry that executes one or more processes described hereinafter. In other embodiments, the image processor 150 includes one or more computer unit(s) and one or more display unit(s) which may be connected to the image processor 150 via a high definition multimedia interface (HDMI). The description of an HDMI connection is provided for exemplary purposes only and any other connection interface able to output high definition video image data maybe be used.

Figure 2:
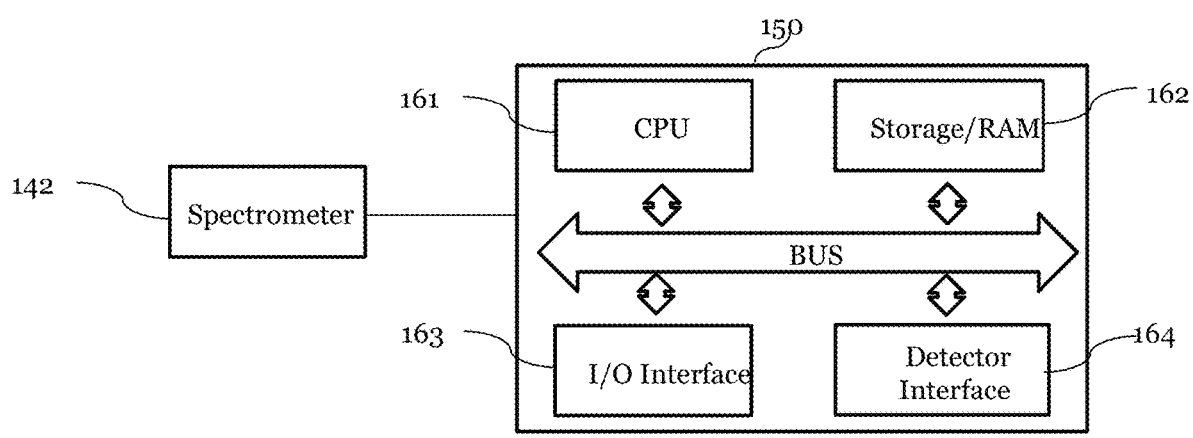
FIG. 2 is a block diagram of an embodiment.

FIG. 2 is an illustration of the hardware components that may comprise the image processor 150 and its connection to spectrometer 142 described hereinabove in FIGS. 1A-1C. The image processor 150 includes one or more processor(s) 161 that execute one or more stored control algorithms. The one or more processor(s) 161 may execute instructions to perform one or more functions for operating the image capture apparatus (a) automatically in response to trigger events, (b) in response to user input or (c) at a predetermined time. The image processor may include an I/O interface in which commands are received via one or more an included or separately attached touch panel screen, keyboard, mouse, joy-stick, ball controller, and/or foot pedal. A user/operator may cause a command to be initiated so as to observe or gather information about a subject which may be inside a human body through an exemplary front-view SEE probe using the image processor 150. For example, when the user inputs a command, the command is transmitted to a CPU 161 for execution thereby.

The image processor 150 may include a CPU 161, Storage/RAM 162, I/O Interface 163 and a Detector Interface 164. Also, the image processor 150 may also comprise one or more devices. The image processor 150 may include one or more general purpose computers or may include application specific processors, such as an ASIC, DSP, FPGA, GPU, FPU, etc.

The image processor 150 may be programmed to execute one or more image processing algorithms such as noise reduction, coordinate distortion correction, contrast enhancement and so on. In one embodiment, the image processor 150 obtains angular information associated with one or more detection fibers relative to a fixed point in order to identify a position of the illumination fiber within a sheath. The embodiment detects an intensity of light emitted by at least one rotating optical fiber that rotates about an axis of rotation and which is reflected from a surface. The reflected light is transmitted through one or more detection fibers that each have a known predetermined position relative to one another and to the axis of rotation and use the detected intensities and the known predetermined positions of each of the one or more detection fibers to determine a relative angular position of the rotating optical fiber with respect to the one or more detection fibers. The identified position of the illumination fiber may then be used as an input value for NURD correction algorithm also executed by the image processor 150 which advantageously corrects for non-uniform rotation that is inherent with any rotating illumination fiber. In some exemplary embodiments, a liquid crystal display may be the display. The display may display, for example, the individual images obtained from a single mode or a composite color image according to various exemplary embodiments of the present disclosure. The display may also display other information than the image, such as the date of observation, what part of the human body is observed, the patient's name, operator's name and so on.

The one or more processors 161 may include a CPU which is configured to read and perform computer-executable instructions stored in the Storage/RAM 162. The computer-executable instructions may include those for the performance of the methods and/or calculations described herein. The Storage/RAM 162 includes one or more non-transitory computer readable and/or writable media, and may include, for example, a magnetic disc (e.g., a hard disk), an optical disc (e.g., a DVD, a Blu-ray), a magneto-optical disk, semiconductor memory (e.g., a non-volatile memory card, flash memory, a solid state drive, SRAM, DRAM), an EPROM, an EEPROM, etc. Storage/RAM 162 may store computer-readable data and/or computer-executable instructions.

The I/O interface 163 provides communication interfaces to input and output devices, which may include a keyboard, a display, a mouse, a printing device, a touch screen, a light pen, an optical storage device, a scanner, a microphone, a camera, a drive, communication cable and a network (either wired or wireless). The detector interface 163 also provides communication interfaces to input and output devices. The detector may include a detection system such as the spectrometer 142, components within the spectrometer, for example a photomultiplier tube (PMT), a photodiode, an avalanche photodiode detector (APD), a charge-coupled device (CCD), multi-pixel photon counters (MPPC), or other and also components that provide information about the state of the probe such as a rotary encoder, motor drive voltage, thermocouple, etc. Also, the function of detector may be realized by computer executable instructions (e.g., one or more programs) recorded on a Storage/RAM 162.

In an exemplary operation, the user may place the exemplary SEE probe into a sheath, and then may insert such arrangement/configuration into a body of a subject at a predetermined position thereof. The sheath alone may be inserted into the human body in advance, and it is possible to insert the SEE probe into the sheath after sheath insertion. The exemplary probe may be used to observe inside a human body (or other mammalian body) and works as endoscope such as arthroscopy, bronchoscope, sinuscope, vascular endoscope and so on.

Figure 3A:
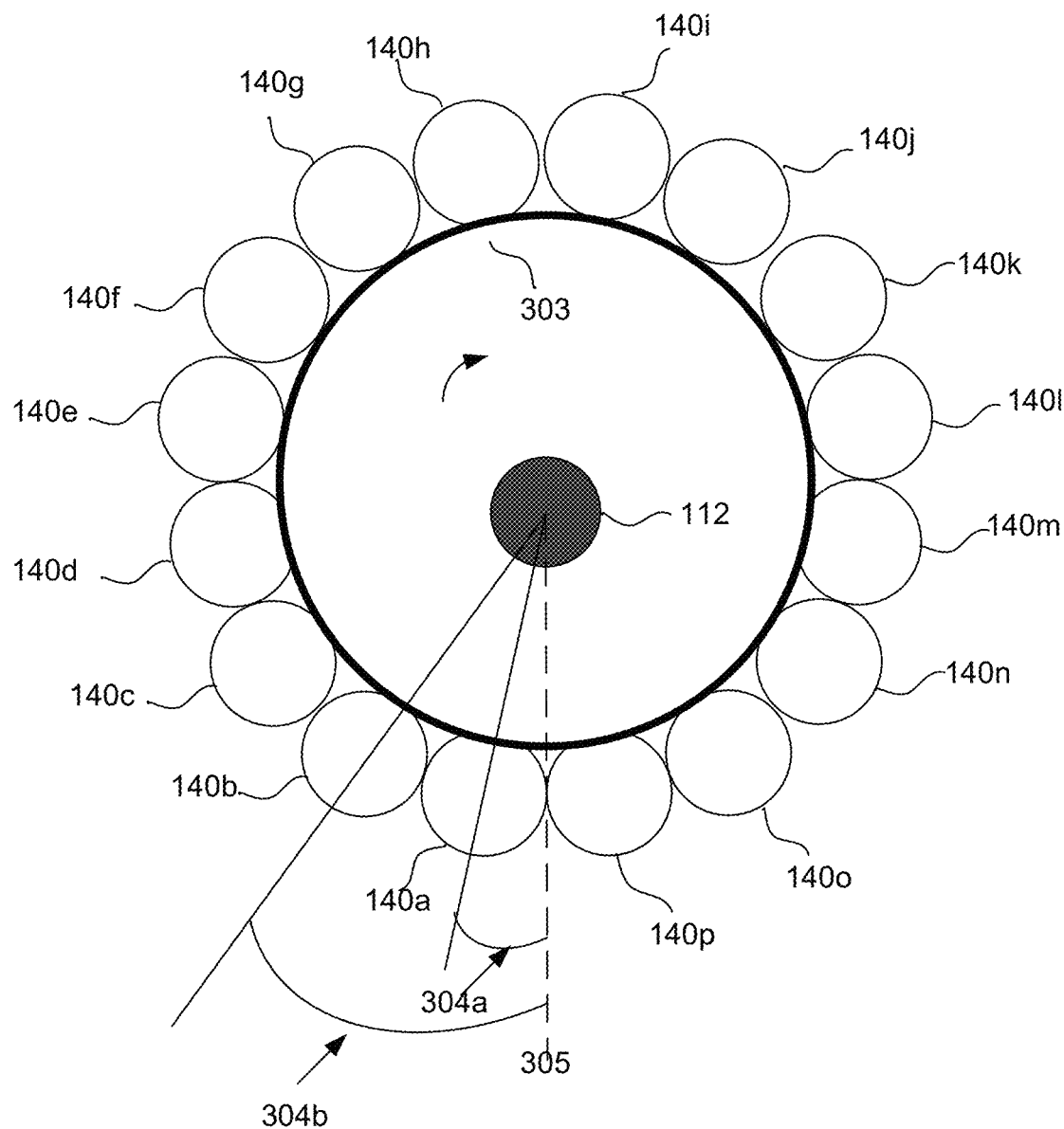
FIG. 3A is a cross-sectional view of a probe according to an embodiment.

FIG. 3A illustrates an exemplary cross section of an exemplary probe illustrated in any of FIGS. 1A-1C. The probe 120 includes the illumination fiber 112 that is selectively rotated about an axis 360 degrees in a direction indicated by the arrow such in order to emit light onto a surface to be imaged. The rotational arrow in FIG. 3 indicates a clockwise rotational direction but it should be understood that the rotational direction may also be counter-clockwise. A sheath 303 surrounds the illumination fiber 112 which is disposed on within the sheath 303. The sheath 303 may be formed from any flexible material that is safe for insertion into a body and which can serve to guide the illumination fiber 112 at the direction of an operator in order to successfully obtain an image from within the body. Positioned on an exterior surface of the sheath 303 are one or more detection fibers, referred to generically by reference numeral 140. The detection fibers 140 are stationary fibers and do not rotate. The one or more detection fibers have a known predetermined position relative to one another and to the axis of rotation of the illumination fiber. In other embodiments, the detection fibers are multi-mode fibers. The detection fibers may be, for example, a single clad or a double clad fiber. In other embodiments, the stationary fibers may perform a function other than detection of light such as providing a laser or other light to the sample for treatment in vivo. As shown herein, the probe 120 includes first through sixteenth detection fibers 140a-140p disposed on the exterior surface of the sheath 303. The number of detection fibers depicted in FIG. 3 is shown for purposes of example and can include more or less detections fibers. In operation, the probe need only at least two detection fibers because that is the minimum number of detection fibers 140 needed to identify the position of the rotating illumination fiber 112 at any given time. The position information of the illumination fiber 112 can be obtained using the angular information that is known for one or more detection fibers based on the known angle between a substantial center point of a respective detection fiber and a reference point illustrated by the dashed line labeled 305. The position of the reference line 305 is shown for purposes of example only and the reference line 305 may be at any point around the circumference of the sheath 303. Between each respective detection fiber on the sheath 303 and the axis of rotation is known angular information indicated generally by reference numeral 304. As shown herein, arc 304a indicates first known angular information representing a known angle between the first detection fiber 140a and reference point 305 and arc 304b indicates second known angular information representing known angles between the second detection fiber 140b and reference point 305. Thus, when a first detection fiber 140a measures a light intensity value that is greater than any other detection fiber 140b-140p, it indicates that the plane of diffracted light of the grating of the illumination fiber 112 is positioned substantially inline with the first detection fiber 140a. For example, as shown herein, if the known angular information 304a indicates that a substantial center point of the first detection fiber 140a indicated by the solid line passing through the first detection fiber 140a is substantially 10 degrees from reference point 305, and the first detection fiber 140a detects light having the greatest intensity (e.g. highest intensity value) relative to all other detection fibers 140b-140p, the apparatus uses the known angular information 304a to identify a current position of the illumination fiber 112 along the circumference of the sheath 303. This positional information can be used to generate a position map relative to time that may be used by the NURD algorithm to correct for rotational defects In exemplary operation, each detection fiber 140-a-140p will detect an amount of light reflected back from the surface being imaged. The detected amount of light at each fiber has varying intensity values at each position during the 360 degree rotation of the illumination fiber 112. By comparing detected light intensity values of each detection fiber within a given time interval, the apparatus is able to identify which of the detection fibers 140 is detecting light having the greatest intensity value (e.g. highest intensity). From this, the apparatus can use the known angular position of the particular detection fiber 140 detecting light having the highest intensity at that given time with respect to the reference point 305 obtain the position of the detection fiber 140 detecting light at the highest intensity at the particular point in time. Knowing the positional information of the illuminating fiber 112 advantageously enables a NURD correction algorithm to correct the image being captured and output to a display.

Figure 3B:
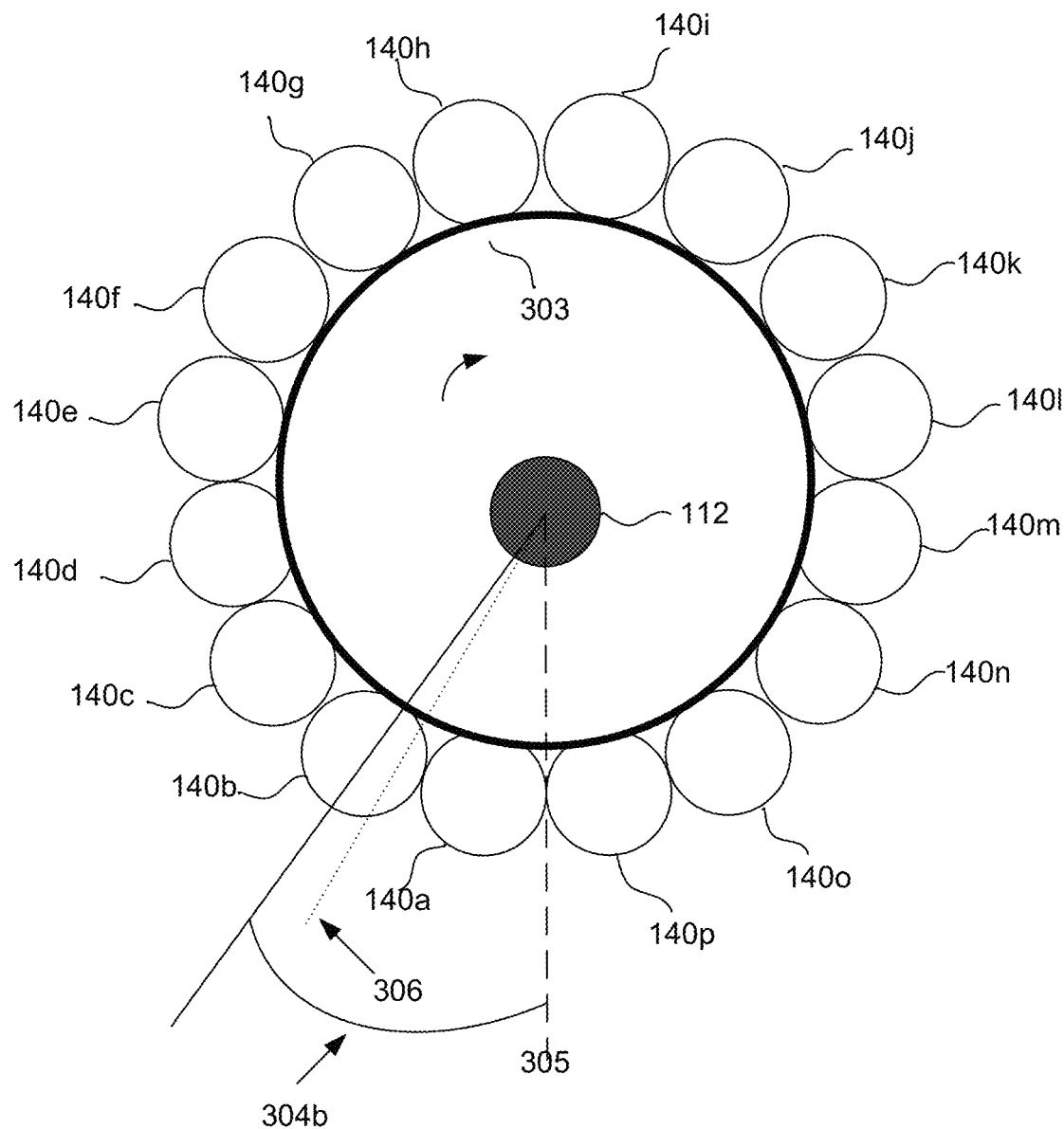
FIG. 3B is a cross-sectional view of a probe according to an embodiment.

FIG. 3B illustrates further exemplary operation including an interpolation function that advantageously enables the apparatus to determine the position of the illumination fiber by using comparative light intensity values detected between adjacent detection fibers. The interpolation function interpolates detected intensity values within a predefined angular range and uses the interpolated intensity values to determine a relative angular position of the illumination fiber with respect to one or more detection fibers by analyzing or determining where the interpolated intensity has the greatest value. As shown herein, at a given time (or within a given time interval), light having the highest intensity value is illustrated by the dotted line labeled 306. The intensity values detected by the first detection fiber 140a and second detection fiber 140b are close in value. In this instance, the apparatus can interpolate a more precise position of the plane of diffracted light of the grating of the illumination fiber 112 using the known angular information 304b between a substantial center point of the second detection fiber 140b and the reference point 305. An angle between the plane 306 and the reference point can be obtained and subtracted from the angular information 304b to indicate, with greater accuracy, a position of the illumination fiber to generate an undistorted image of the surface being scanned for imaging by probe 120.

In another embodiment, the apparatus may use known positions of each detection fibers along a circumference of the sheath 303 to identify a position of the illumination fiber 112. In such an example, if first detection fiber 140a is detecting light having the highest intensity value of when considering the respective intensity values all of the other detection fibers 140b-140p, the apparatus obtains first angular information 303 representing an angle between a detection fiber (first detection fiber 140a) and an adjacent detection fiber (second detection fiber 140b) and obtains second angular information 304 representing an angle between the detection fiber (first detection fiber 140a) and another adjacent detection fiber (sixteenth detection fiber 140p). The first and second angular information is used to identify the position of the illumination fiber 112 in order to generate an undistorted image of the surface being scanned for imaging by probe 120.

Figure 4A:
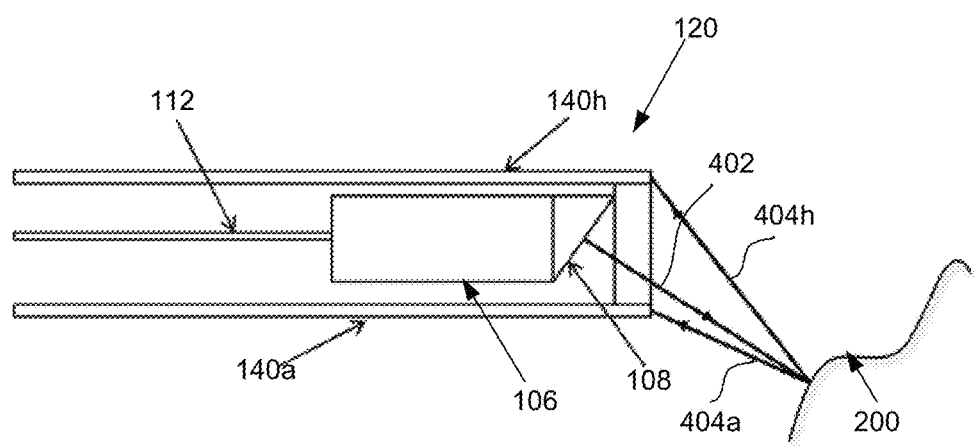
FIG. 4A is a diagram of a probe according to an embodiment.

FIG. 4A illustrates one embodiment for detecting angular position information for use in correcting non-uniform rotational distortion that may be present in an image captured by an image capturing apparatus. FIG. 4A is a cross-sectional view of illumination fibers 112 and probe 120 taken along the dotted line shown in FIG. 3 (e.g. reference point 305). One or more illumination fibers 112 is coupled to a proximal end of the probe 120. The probe 120 includes a focusing component 106 that collimates but slightly focuses light provided by the illumination fiber 112. Exemplary types of focusing components include but are not limited to a GRIN lens or one or more micro lenses. A spacer 108 is coupled to a distal end of the light guiding component 106 opposite a point at which the illumination fiber 112 is connected. In certain embodiments, the spacer 108 may be air, glass, or epoxy. The spacer 108 is normal-polished at the proximal end at the point at which the spacer 108 contacts the light guiding component 106. The spacer 108 may be angle-polished at the distal end such that the distal end can be used as mirror when light from the light guiding component 106 is incident on the surface 200. In certain embodiments, the angle-polished surface of the spacer 108 can have, for example, a metallic or dielectric coating to increase the reflectivity thereof. Further, the distal end of the spacer 108 is used as a base for a dispersive element 118 such as a grating. The dimensions of the spacer 108 are determined so that the light coming through light guiding component 106 is reflected and goes into the dispersing component 118 which is used to disperse the light into a spectrally encoded line that is emitted in a direction towards an imaging surface 200 which reflects the emitted light back for detection by the one or more detection fibers 140 that surround the probe 120 and illumination fiber 112.

In exemplary operation, light emitted from a distal end of the probe 120 exits the spacer 108 and is dispersed by dispersing element 118 into a spectral line directly onto the surface to be imaged 200. The light emitted by the probe travels on an emission pathway indicated by reference numeral 402 until it reaches the surface 200 where, depending on the characteristics of the surface 200, certain wavelengths are absorbed by the surface 200 and other wavelengths are reflected back towards the probe 120 for detection by the detection fibers 140. The wavelengths of light that are reflected by the surface 200 travel along reflection pathways which are illustrated by reference numerals 404. FIG. 4A depicts a two dimensional illustration of this whereby a first reflection pathway 404a is detected by the first detection fiber 140a and a second different reflection pathway 404b is reflected for detection by the eighth detection fiber 140h. In this two dimensional illustration, the distance traveled by the light traveling along the first reflection pathway 404a is shorter than a distance traveled by the light travelling along the second reflection pathway 404b. The shorter distance between the reflection surface and a respective detection fiber 140 may cause the detected light to have a higher intensity value and indicates that the position of the probe 120 emitting the light is closer to the detection fiber 140 that detects the reflected light having a greater intensity value as compared to the intensity value of adjacent or neighboring detection fibers. For example, in this two dimensional illustration, if the first detection fiber 140a and the eighth detection fiber 140h were the only two detection fibers being used, the light detected by the first detection fiber 140a would have a higher intensity value relative to the light detected by the eighth detection fiber 140h because the longer distance between the surface 200 and the eight detection fiber 140h may cause the light traveling along reflection path 404b to disperse more than the light traveling on reflection pathway 404a resulting in a lower intensity value.

Figure 5A:
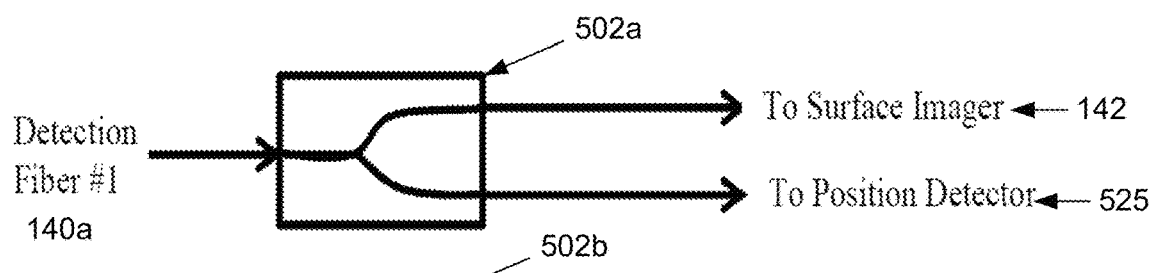
FIG. 5A is a table of light intensities used in accordance with an embodiment.
Figure 5B:
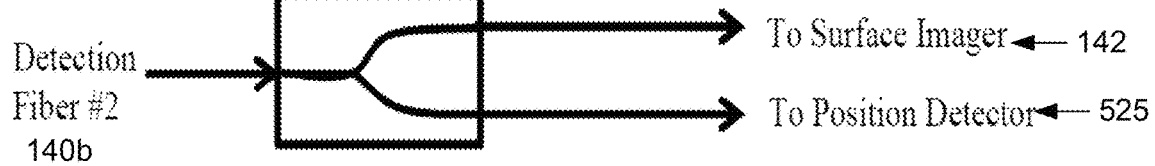
FIG. 5B shows schematic of another embodiment.
Figure 5B:
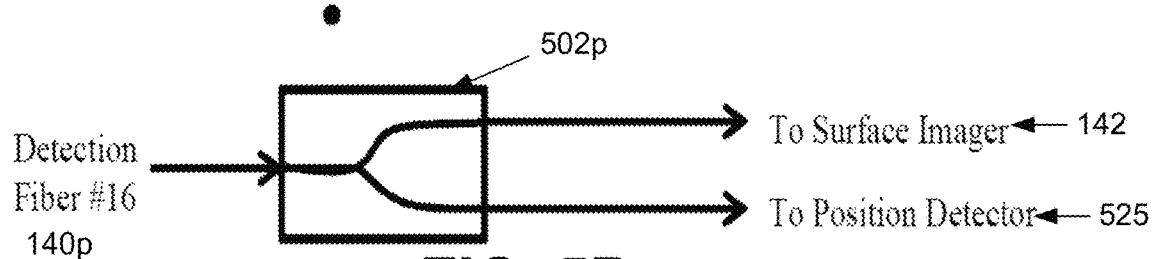

An exemplary way that the apparatus according to invention principles determines which detection fiber 140 is detecting light having the highest intensity value relative to all other detection fibers is shown in FIGS. 5A & 5B. Conventionally, all detected light from the detection fibers is combined together and passes through a spectrometer where it is dispersed to a line of multiple color wavelengths which is then projected onto a single dimension CCD array, where light intensity of each different wavelength is converted to a value of electrical signal. An exemplary embodiment of the apparatus described herein separates the light detected by each detection fiber and using a two dimensional array. By separating light detected by each detection fibers and using a two dimensional CCD array, the light from each detection fiber is dispersed into a separate rainbow line as shown in FIG. 5A to get the rotational information from the data. For example, the second dimension may represent light within the red band of visible light ranging between 600 nm and 800 nm and each column may correspond to an individual wavelength within that spectrum or a group of wavelengths within that spectrum. The mention of the predetermined wavelength range being within the red band of visible light is advantageous because the red band of light possesses greater angular information because the red light is defected the most by the grating while the blue light is deflected the least. In fact, blue light travels at a substantially straight path on the axis. As a result, the difference in distances traveled by light to different detection fibers is the greatest for red light and the positioning accuracy derived from the red light intensities is better. However, it should be understood that using only the blue band or the green band or a combination of one or more bands of light is possible.

Once the array shown in FIG. 5A is completed and an intensity value is populated for each column and each row, the total intensity value for a given detection fiber may be determined by summing the intensity values in each column for the given row whereby the row having the highest summed intensity value is indicative of that particular detection fiber having the greatest intensity value at that given point in time relative to all other detection fibers. From that determination, the system identifies the detection fiber having the highest or greatest intensity value and obtains angular information identifying angles between the detection fiber having the highest intensity value and a fixed reference point in order to identify the position of the angled surface of the spacer of the probe from which light is being emitted which can then be used to correct for any NURD effect caused by rotational friction of the probe 120. The angular information required for NURD effects free image processing is the angle between the stationary detection fiber array and the plane of diffracted light of the grating at each data point. If we call the angle between the plane of diffracted light of the grating and the detection fiber 140a as 0 degrees, then when the light intensity in fiber # k of N equally spaced detection fibers is the maximum of all fiber we can say that angular position of illumination fiber is 360*k/N degrees. Then, when the substrate surface image is reconstructed on the screen each surface scan line is positioned in thus obtained corresponding angular orientation.

Furthermore, the data points within this array can be used by the surface imager in order to provide image data for display on a display screen. In addition to summing across the rows to obtain intensity value information, each column can be summed vertically along the different detection fibers in order to provide one data point for each wavelength capable of being detected. The wavelength information may be used by the surface imager to generate the image for display.

It should be understood that the description above with respect to FIG. 5A illustrates the light intensity detection at a single point in time during a single 360 degree rotation of the probe. In operation, the generation of the two dimensional array and determination as to which detection fiber is detecting light having the highest intensity is a continually occurring process whereby an two dimensional array may be generated in temporary storage such as a buffer until such time that the array is populated and summation of the intensity values across the rows can occur. Thus, the system should have sufficient temporary storage buffers that can store a plurality of sequential two dimensional arrays representing respective points in time.

FIG. 5B illustrates another embodiment for determining which detection fiber 140 is detecting light of the highest intensity. In this embodiment, at a point between respective detection fibers of the probe 120 and the spectrometer, one or more filters or beam splitters 502 may be positioned to separate the signal detected by the detection fibers 140. If a separate wavelength (e.g. near infrared) is used for position measurements, then a dichroic filter may be used to separate signal with this wavelength. If no additional spectral range is used for position detecting, then a beam splitter just separates portion of the beam for intensity analysis. In this embodiment, for each detection fiber, the filter 502 separates the signal in to a first signal 510 to be provided to the spectrometer 142 for surface imaging processing which occurs in a known manner and a second signal 520 which is provided to a positional detector 525. The positional detector 525 may be implemented as part of the image processor 150. Alternatively, the positional detector may be embodied as its own hardware processor that executes an algorithm stored in a memory to detect light intensities for each detection fiber. In another embodiment, individual outputs from the filters 502 of each detection fiber feed into a single positional detector which can determine, which if the respective detection fibers is detecting light having the highest intensity value relative to all other detection fibers. In this embodiment, the positional detector 525 generates a one dimensional array representing intensity values detected by respective detection fibers.

For each scanned line, the fiber-to-fiber intensities obtained using one of the methods discussed above can be analyzed and fit to a particular curve where the curve's maximum value will determine the angular position of the scanned line on the image. In one embodiment, the data set is analyzed by fitting a curve (polynomial or trigonometric) to it and then find a maximum for the resulting curve which will indicate the angular position of the illumination fiber. The resulting analysis is illustrated in the set of graphs in FIGS. 6A-6D which represent a series, in time, of scanned lines that enables positional information of the rotating probe (e.g. optics) to be obtained in view of the know relation of the optics to the detection fiber that is currently detecting the maximum light intensity value. It should be noted that the particular maximum value detected is not relevant to the determination of positional information. Rather, the algorithm merely needs to have a maximum value relative to all other light intensity values detected by the other detection fibers. One reason why the actual intensity value has no impact is due to the characteristics of the surface being scanned which could have different reflective properties thus impacting the intensity of light able to be detected. However, the important aspect is intensity detected by each fiber relative to the other fibers so that position of the rotating optics can be more precisely determined in view of the known angular information between the fiber detecting the highest intensity light versus the adjacent detection fibers that are detecting an intensity of light less than the highest detected intensity value.

Figure 6B:
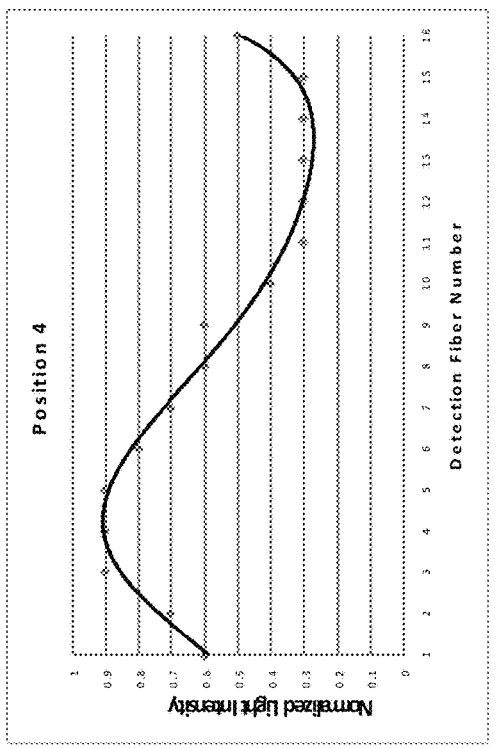
FIGS. 6A-6D illustrate graphs of an embodiment.
Figure 6D:
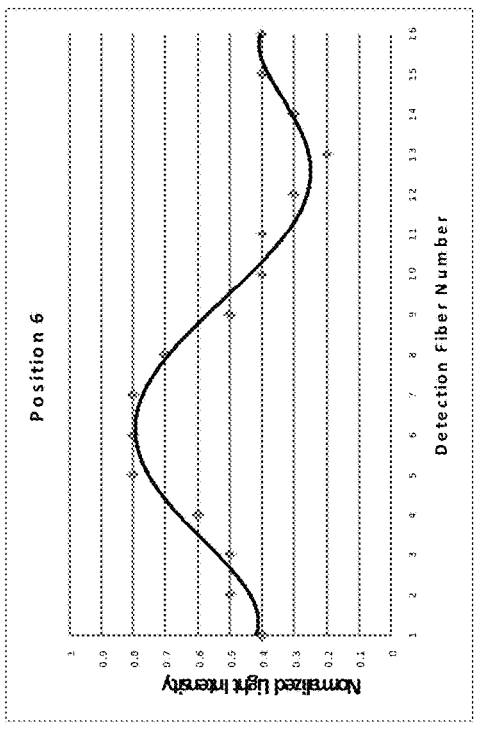
Figure 6A:
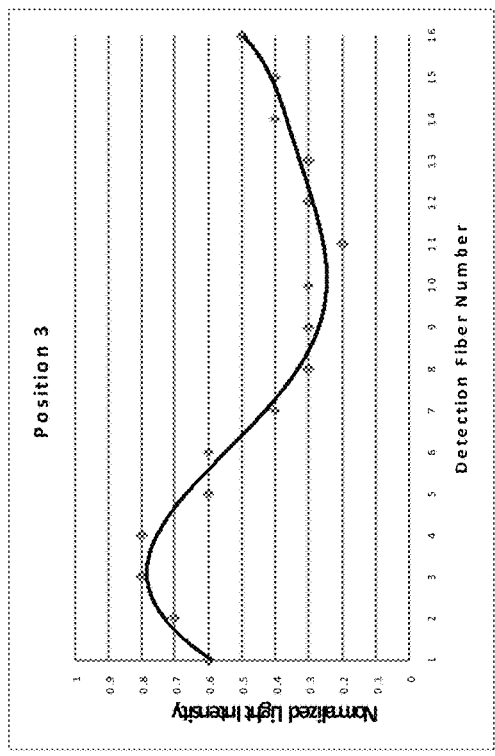
Figure 6C:
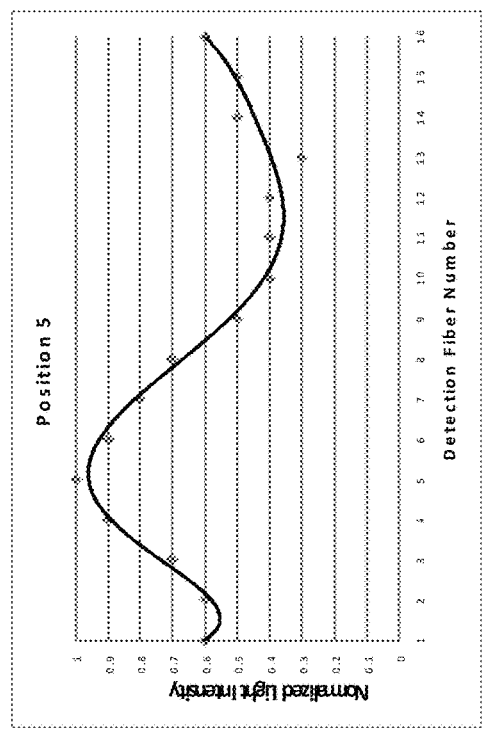

In each of the graphs in FIG. 6A-6D, the x-axis lists values in degrees each detection fiber (and therefore gives a rotational position) and the y-axis provides a normalized light intensity measurement value representing the intensity of light detected by each respective detection fiber. FIG. 6A represents a first point in time during a rotation and indicates that the maximum light intensity is being detected by the third detection fiber. For this point in time, angular information between the third detection fiber and each of the second and the fourth detection fibers can be obtained to identify the position of the probe at that given time. FIG. 6B represents a second, subsequent point in time during the rotation and indicates that the maximum light intensity is being detected by the fourth detection fiber. For this point in time, angular information between the fourth detection fiber and each of the third and the fifth detection fibers can be obtained to identify the position of the probe at that given time. FIG. 6C represents a third, subsequent point in time (following the second point in time) during the rotation and indicates that the maximum light intensity is being detected by the fifth detection fiber. For this point in time, angular information between the fifth detection fiber and each of the fourth and the sixth detection fibers can be obtained to identify the position of the probe at that given time. FIG. 6D represents a fourth, subsequent point in time (following the third point in time) during the rotation and indicates that the maximum light intensity is being detected by the sixth detection fiber. For this point in time, angular information between the sixth detection fiber and each of the fifth and the seventh detection fibers can be obtained to identify the position of the probe at that given time.

FIGS. 6A-6D merely illustrate a snap shot of graphs indicating the relative intensity of light detected by individual fibers during a rotational cycle. By identifying intensity values for light detected by each detection fibers at a given time, these normalized curves can be generated and used to by the algorithm to identify which of the respective detection fibers is detecting light having a maximum intensity value relative to all other detection fibers.

Figure 4B:
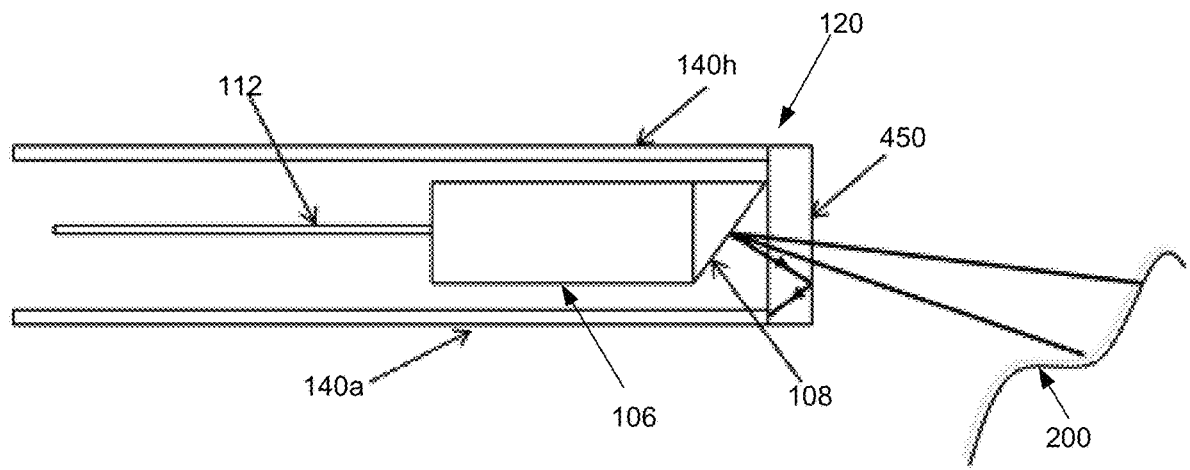
FIG. 4B is a diagram of a probe according to an embodiment.

Turning back to FIG. 4B, a further embodiment for identifying which of the detection fibers that surround the probe 120 is detecting a maximum light intensity value is illustrated. FIG. 4B shares many similar components described above with respect to FIG. 4A and will be denoted by the same reference numerals. Thus, the description of those components and the manner in which they operate will not be repeated and instead are incorporated by reference in their entirety. The following description will illustrate the difference present in this embodiment. The principle of operation remains the same whereby light emitted from the spacer 114 of the probe 120 is reflected back for detection by each of the detection fibers that surround the probe 120. However, in this embodiment, at the distal end of the probe 120, a filter 450 (or optical window) is positioned that can reflect a predetermined wavelength or a range of predetermined wavelength. In one embodiment, the filter 450 may be a notch filter. In another embodiment, the filter 450 is capable of reflecting light in the non-visible light spectrum such as infrared (IR) spectrum. When the filter 450 reflects the light back for detection by each of the detection fibers 140a-140p, a detection fiber 140 that detects light having a maximum intensity value relative to all other detection fibers can be determined. This embodiment provides an advantage because a more accurate intensity value at each fiber can be obtained due to the reflective properties of the filter 450 and the fact that the reflected light is not being influenced by the surface to be imaged. However, this embodiment does have an additional cost associated therewith in that the additional filter 450 component needs to be included.

In a further embodiment, a probe 120 operating in accordance with both embodiments of FIGS. 4A and 4B can be combined. In an embodiment such as this, the detected intensity values at each detection fiber 140a-140p using both the reflected light from the imaging surface and the light in the predetermined wavelength range reflected back by the filtering component can be used together. In one embodiment, the detected light intensity values can be used as a check to confirm that a particular detection fiber identified as sensing the maximum light intensity value by one method is correct using the sensed value according to the other method. In yet another embodiment, an aggregate maximum intensity value can be determined using the maximum intensity value detected based on imaging surface reflection and maximum intensity value detected based on filter reflection value.

Figure 7:
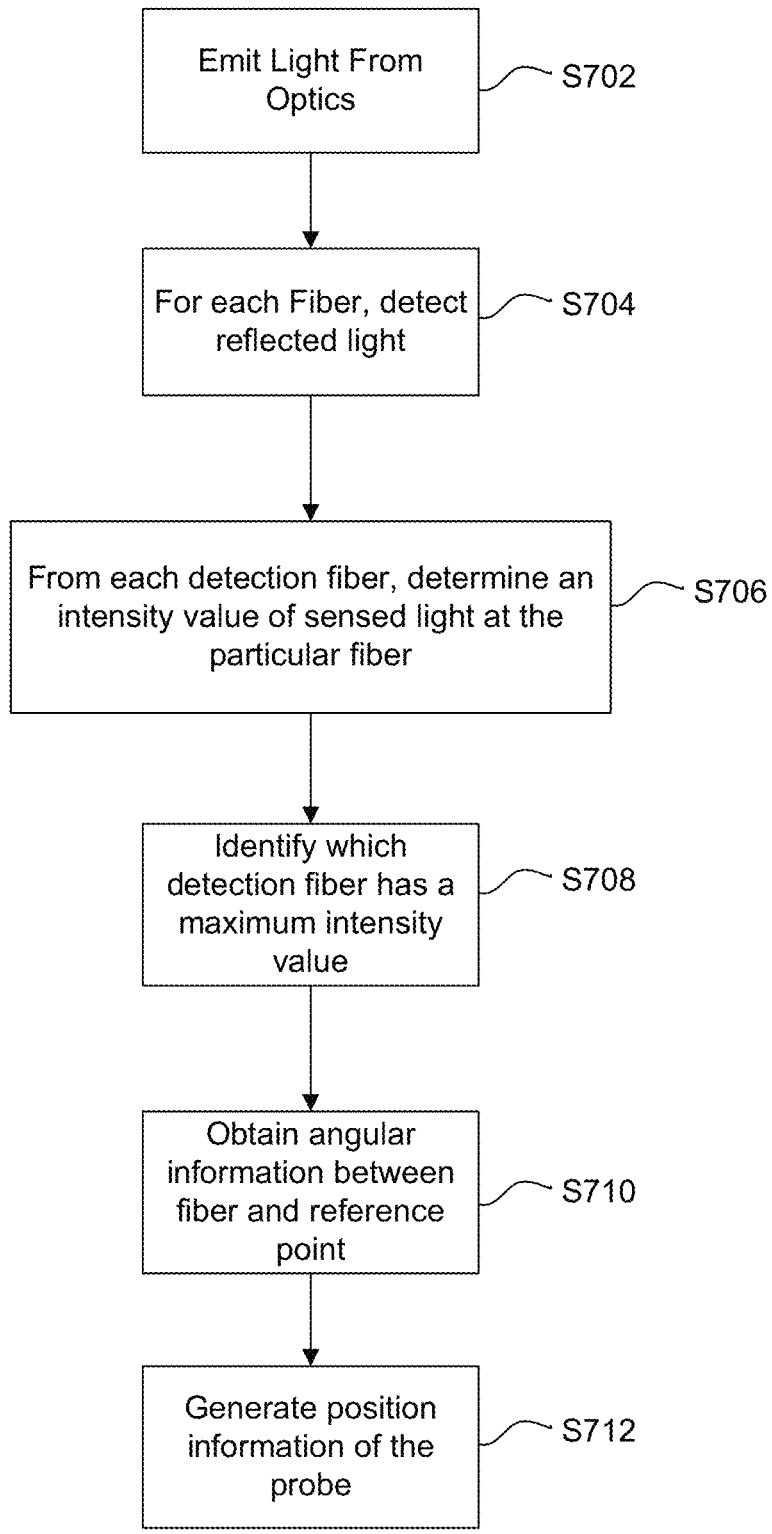
FIG. 7 is a flow diagram of an algorithm according to an embodiment.

An exemplary algorithm executed by one or more processors for determining position information of a light emitting probe during a rotation is shown in FIG. 7. As described herein, the method enables the detection of a position of the rotating illumination optics that rotate about an axis of rotation by detecting a position with respect to the at least two detection fibers that is detecting light at the greatest intensity value within a particular time interval. The position at which light having the greatest intensity value is detected may or may not be binary with respect to an individual stationary (e.g. detection fiber) The algorithm described herein advantageously enables precision determination of the position of the rotating illumination optics even of one or more of the stationary fibers are detecting a same light intensity value by not just determining the stationary fiber having the greatest (e.g. brightest) intensity by interpolating all intensity data to acquire the most accurate position.

In step S702, light from the illumination optics is focused by a focusing component, dispersed by a dispersing element into a spectral line and emitted along an emission pathway and is reflected by a surface back towards one or more detection fibers surrounding the probe. In one embodiment, the surface reflecting the light is a surface to be imaged. In another embodiment, the surface is a filter (or optical window) that reflects a predetermined wavelength or range of wavelengths. In step S704, each detection fiber surrounding the probe senses the intensity of the light being reflected by the surface within a given time interval. In step S706, from each detection fiber, an intensity value associated with the light sensed by the respective detection fiber is determined. Step S706 may be implemented in accordance with the descriptions of FIGS. 5A and 5B discussed above. In this step, the algorithm analyzes intensity data by fitting the curves in order to determine a maximum for each curve indicative of light intensity at a given detection fiber. In step S708, a determination is made to identify which of the respective detection fibers has detected a maximum light intensity using the maximums of the curves fit in S706. This determination for each detection fiber is made relative to a fixed reference point (e.g. the axis of rotation) using the plot of the intensity values generated S706. In step S710, angular information between the identified detection fiber determined to have sensed the maximum light intensity value and the reference point is obtained and is used, in step S712, to generate position information indicative of a position of the illuminating fiber of the probe at the time the light was emitted. For example, the intensity of light detected by each of the detection fibers, which have a known position relative to one another and to the axis of rotation of the probe, is detected over a give time interval and used, along with the known positions of each of the detection fibers to determine a relative angular position of the probe with respect to the detection fibers. Relative angular position of the rotating probe with respect to the detection fibers can occur by selecting which of the detection fibers is transmitting light having the greatest intensity. Additionally, or alternatively, detected intensity values within a predetermined range may be interpolated and used to determine relative angular position of the probe with respect to the detection fibers by analyzing and determining where the interpolated intensity has the greatest value. The generated position information can then be used to correct for any NURD present in the image to be displayed.

The above described NURD correction algorithm advantageously uses light intensity information obtained from stationary detection fibers to extract angular position information of a probe used for imaging a surface to enable correction of the resulting image for NURD without adding significant structural components that were conventionally used to correct for NURD. This is particular advantageous when considering probes intended to be single use probes or limited use probes to be disposed. Further, by implementing the NURD correction as discussed above, it enables the use of oscillating illumination fibers for a color probe without the need of a rotary junction because oscillating illumination exacerbates the NURD phenomenon along with additional positional uncertainties which can now be mitigated. Additionally, the position information of the probe determined in accordance with the algorithm of FIG. 7 may also be used as a feed back control for controlling the rotation mechanism (e.g. rotary motor) to further reduce the impact of NURD.

Figure 8A:
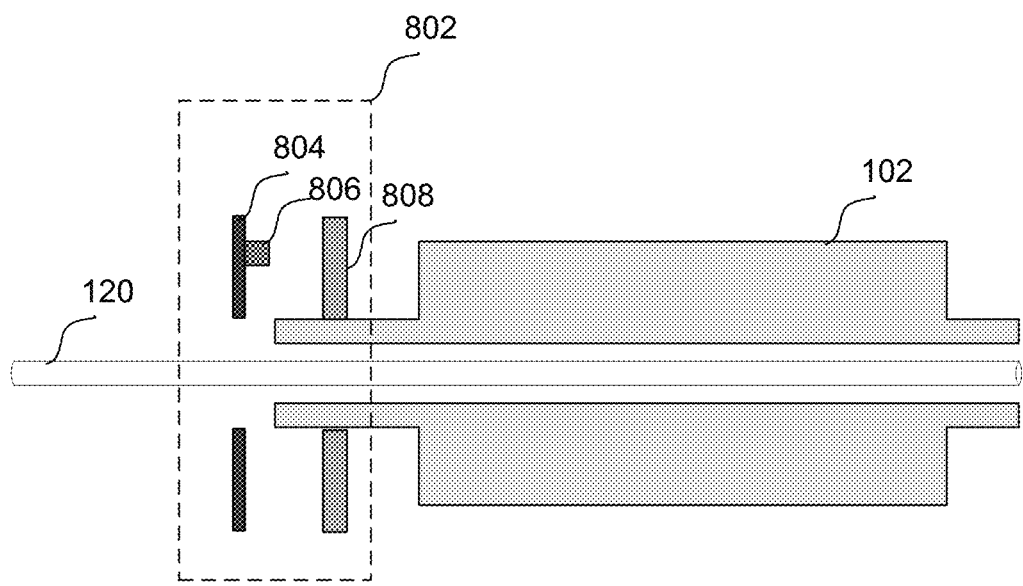
FIG. 8A is a cross-sectional view of a probe according to an embodiment.

The feedback control mechanism for correcting NURD within an image generated from light reflected from a surface and detected by the one or more stationary detection fibers will now be described with respect to FIGS. 8A, 8B and 9. FIG. 8A illustrates a cross section of an exemplary spectrally encoded endoscopic system that has been described hereinabove. The system includes a motor 102 that controls the rotation of the optical fiber of the probe 120. In one embodiment, the motor 102 is a rotary junction. However, this is described for purposes of example only and any type of motor that can cause the probe 120 to rotate may be implemented.

The system shown in FIG. 8A is known way to correct NURD which uses an encoder 802 that determines motor location feedback data which then may be used to correct NURD in images captured by the spectrally encoded endoscopic system. The encoder 802 includes circuit board 804 including a sensor 806 and an optical disk 808. The optical disk 808 is connected to and rotates with the motor shaft. The circuit board 804 and sensor 806 are independent from the motor and motor shaft and remains stationary relative to the rotating optical disk 808. In operation, as the motor shaft rotates, the sensor 806 tracks the rotation of the optical disk and that tracking data may be used to provide rotational angular position of the shaft. This data may then be used as a correction factor to be applied in an image correction algorithm for correcting NURD distortion.

While the use of an encoder 802 to determine rotational angular position data to correct for NURD improves the resulting image output by the system, there are certain drawbacks of this method of correcting for NURD. Using a system with the encoder 802 is more technically complex and results in a higher manufacturing cost. For example, in a spectrally encoded endoscopic system such as described herein that includes a hollow motor shaft, the circuit 804 including the sensor must be designed with a hole though which the motor shaft passes. Additionally, the motor location feedback data may not be representative of the angular position of the distal tip of the drive cable in the SEE probe 120.

The structure of the probe 120 as described hereinabove which includes stationary detection fibers that surround the rotating optical fiber improves the ability to correct NURD because the information used to generate the angular position of the distal tip of the probe provides for a truer location/position of the probe thereby enabling better NURD correction. The improved embodiment is shown in FIG. 8B and eliminates the need to include any encoder or other mechanism that determines angular position of the probe based on a position of the motor shaft that is rotated.

As discussed above, the SEE detection scope including the ring of stationary detection fibers that collects (detects) light emitted by the rotationally scanning optics and which is reflected from the surface to be imaged yields an improved NURD correction factor. This improvement is the result of truer position of the distal end of the probe 120 as determined by the timing at which the reflected light is detected by the stationary detection fibers as compared to the estimated position of the distal end of the probe based on the position of the rotating motor shaft.

In operation, the generation of the improved NURD correction factor occurs when the scanned input light collected by the one or more stationary detection fibers is processed by a spectrometer and image processor (see FIG. 2) to form the image. This same light collected by the one or more stationary detection fibers (e.g. ring of fibers) can be used in determining the angular position of the distal end of the illumination optics by measuring which of the one or more detection fibers are detecting the most light (e.g. highest light intensity). As the number of stationary detection fibers in the ring of fire increases, the accuracy of determining angular position of the illumination optics also increases. Using the angular position of the distal end of the probe as described herein advantageously yields an improved NURD correction factor that can be used by an image correction algorithm to adjust and/or correct NURD distortion in an image. Thus, in addition to the improvement to the correction factor due to it being derived from a more accurate position of the distal end of the probe, the above described probe structure having a rotating optical fiber surrounded by a ring of one or more stationary detection fiber eliminates the need to include the encoder 802 thereby reducing the complexity and cost of manufacturing the SEE system. An exemplary embodiment of the improved SEE without the encoder 802 is shown in FIG. 8B.

Figure 8B:
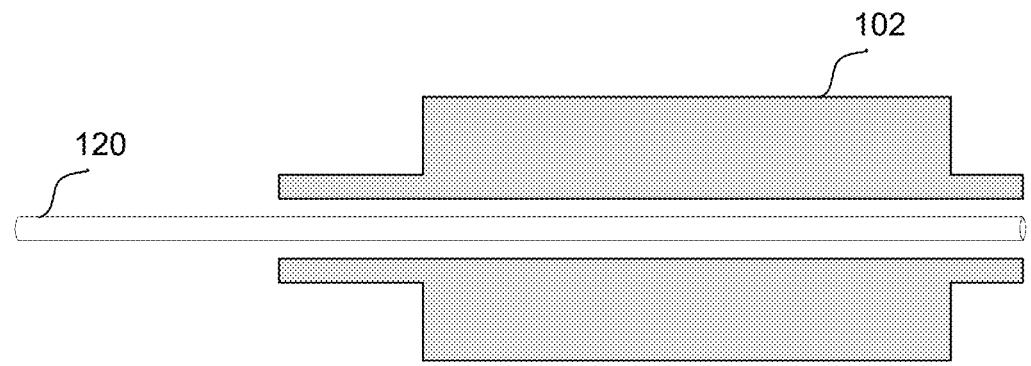
FIG. 8B is a cross-sectional view of a probe according to an embodiment.
Figure 9:
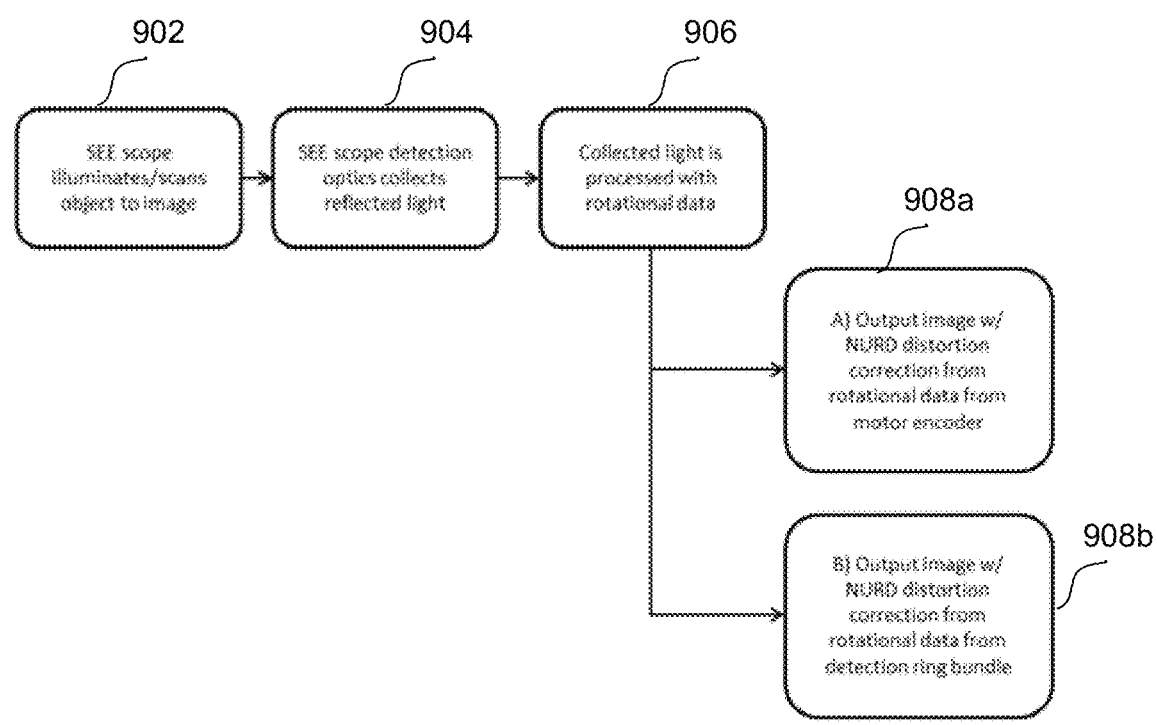
FIG. 9 is flow diagram of an algorithm according to an embodiment.

A flow diagram detailing an exemplary operation according to FIG. 8A and/or 8B is shown in FIG. 9. In step S902, the SEE scope emits light via the rotating optical fiber to illuminate/scan an object to be imaged. In step S904, the one or more stationary detection fibers in the ring of fibers detects/collects light reflected from a surface of the object to be imaged. In step S906, processing the light detected/collected by the one or more stationary fibers to obtain rotational data representing the angular position of the illumination optics is performed. In one embodiment, the processing in step S906 includes one or more steps described hereinabove with respect to FIG. 7. The result of the processing in step S906 is a NURD correction factor that can be used to correct NURD distortion in an image representing the surface of the imaging object. In one embodiment, in step S908a, where the SEE includes the encoder 802 in FIG. 8A, an image of the surface of the object is generated and NURD is corrected using the NURD correction factor based on the rotational data of the motor shaft. In another embodiment, in step S908b, wherein the SEE omits the encoder 802 and includes the ring of one or more detection fibers surrounding the illumination optics, as shown in FIG. 8B, an image of the surface of the object is generated and NURD is corrected using the NURD correction factor based the angular position data derived from the rotational data from the ring of detection fibers. Typically, the resulting image output via step S908a will have equal or more NURD distortion as compared to the image output via step S908b because the NURD correction factor used in S908a is based on motor rotation position which estimates the angular rotation of the rotating illumination optics whereas the NURD correction factor in S90b is based on actual position of the rotating illumination optics when the light is collected by the ring of stationary detection fibers.

It should be noted that, although FIG. 8A is described as including an encoder to determine the position of the illumination optics, the embodiment in FIG. 8A does not necessarily exclude a probe 120 having the rotating illumination fiber surrounded by a ring of one or more stationary detection fibers as described with respect to FIG. 8B. That is to say, that an alternate embodiment is contemplated that includes both the encoder 802 and a probe such as the one described above in FIG. 3A/3B. In such an embodiment, a combination of data derived based on the rotation of the motor shaft and the actual position of the rotating illumination fibers may be used to generate a NURD correction factor.

It should be understood that if an element or part is referred herein as being "on", "against", "connected to", or "coupled to" another element or part, then it may be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90° or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

The foregoing merely illustrates the principles of the disclosure. Various modifications and alterations to the described exemplary embodiments will be apparent to those skilled in the art in view of the teachings herein. Indeed, the arrangements, systems and methods according to the exemplary embodiments of the present disclosure can be used with any SEE system or other imaging systems.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

We claim:

1. An apparatus comprising:
   at least one rotating optical fiber rotating about an axis of rotation that emits light towards a surface;
   at least two stationary fibers for transmitting light reflected from a surface, each of the at least two stationary fibers having a known predetermined position relative to each other and to the axis of rotation of the at least one rotating optical fiber;
   at least one detector configured to detect an intensity of light transmitted through each of the at least two stationary fibers within a given time interval;
   at least one calculator configured to
     use the detected intensities and the known predetermined positions of each of the at least two stationary fibers to determine a relative angular position of the rotating optical fiber with respect to the at least two stationary fibers.

2. The apparatus of claim 1, further comprising
   an image processor that uses the determined angular position within a given time interval to correct one or more defects caused by non-uniform rotation in an image generated from light transmitted through each of the at least two stationary fibers.

3. The apparatus of claim 1, wherein
   the at least one calculator is configured to determine a relative angular position of the rotating optical fiber with respect to the at least two stationary fibers by selecting which of the at least two stationary fibers transmitting light has the greatest intensity.

4. The apparatus of claim 1, wherein
   the at least one calculator is configured to interpolate the detected intensity values within a predefined angular range, and use the interpolated intensity values to determine a relative angular position of the rotating optical fiber with respect to the at least two stationary fibers by analyzing where the interpolated intensity has the greatest value.

5. The apparatus of claim 1, wherein
   the at least one calculator is configured to
   generate a two dimensional array of transmitted light intensity values with a first dimension representing respective ones of the at least two stationary fibers and a second dimension representing the wavelength of light transmitted through the at least two stationary fibers;
   use detected intensity values from a predetermined set of respective wavelengths in the second dimension to determine a relative angular position of the rotating optical fiber with respect to the at least two stationary fibers.

6. The apparatus of claim 1, wherein the at least two stationary fibers are equally spaced and arranged in a substantially circular arrangement around the rotating optical fiber, and the at least one calculator is configured to
   identify one of the at least two stationary fibers as transmitting light having the greatest intensity;
   determine the position of the identified one of the at least two stationary fibers relative to all other of the at least two stationary fibers;
   obtain the angular information by multiplying the determined position by a predetermined value and dividing the result by a total number of stationary fibers.

7. The apparatus of claim 1, wherein the surface from which light is reflected when measuring light intensity is a surface from which the image is generated.

8. The apparatus of claim 1, wherein the surface from which light is reflected when measuring light intensity is an optical window positioned at a distal end of the at least one rotating optical fiber.

9. The apparatus claim 1, wherein the at least two stationary fibers include at least sixteen stationary fibers substantially equally spaced from one another and arranged in a substantially circular arrangement around the at least one rotating fiber.

10. The apparatus of claim 1, wherein the determined position with respect to each of the two stationary fibers is one of (a) a respective one of each of the two stationary fibers or (b) a point between adjacent stationary fibers.

11. A method of detecting a position of a rotating optical fiber that rotates about an axis of rotation and that emits light toward a surface comprising the steps of:
   detecting an intensity of light reflected from the surface and which is transmitted through at least two stationary fibers within a given time interval, wherein each of the at least two stationary fibers have a known predetermined position relative to each other and to the axis of rotation of the at least one rotating optical fiber; and
   using the detected intensities and the known predetermined positions of each of the at least two stationary fibers to determine a relative angular position of the rotating optical fiber with respect to the at least two stationary fibers.

12. The method of claim 11, further comprising
   correcting one or more defects caused by non-uniform rotation in an image generated from light transmitted through each of the at least two stationary fibers using the determined angular position within the given time interval.

13. The method of claim 11, further comprising
   determining a relative angular position of the rotating optical fiber with respect to the at least two stationary fibers by selecting which of the at least two stationary fibers transmitting light has the greatest intensity.

14. The method of claim 11, further comprising
   interpolating the detected intensity values within a predefined angular range, and
   using the interpolated intensity values to determine a relative angular position of the rotating optical fiber with respect to the at least two stationary fibers by analyzing where the interpolated intensity has the greatest value.

15. The method of claim 11, further comprising
generating a two dimensional array of transmitted light intensity values with a first dimension representing respective ones of the at least two stationary fibers and a second dimension representing wavelengths of light transmitted through the at least two stationary fibers;
using detected intensity values from a predetermined set of respective wavelengths in the second dimension to determine a relative angular position of the rotating optical fiber with respect to the at least two stationary fibers.

16. The method of claim 11, wherein the at least two stationary fibers are equally spaced and arranged in a substantially circular arrangement around the rotating optical fiber, and further comprising
identifying one of the at least two stationary fibers as transmitting light having the greatest intensity;
determining the position of the identified one of the at least two stationary fibers relative to all other of the at least two stationary fibers;
obtaining the angular information by multiplying the determined position by a predetermined value and dividing the result by a total number of stationary fibers.

17. The method of claim 11, wherein the surface from which light is reflected when measuring light intensity a surface from which the image is generated.

18. The method of claim 11, wherein the surface from which light is reflected when measuring light intensity is an optical window positioned at a distal end of the at least one rotating optical fiber.

19. The method claim 11, wherein the at least two stationary fibers include at least sixteen stationary fibers substantially equally spaced from one another and arranged in a substantially circular arrangement around the at least one rotating fiber.

20. The method of claim 11, wherein the determined position with respect to each of the two stationary fibers is one of (a) a respective one of each of the two stationary fibers or (b) a point between adjacent stationary fibers.

21. A non-transitory computer readable storage medium storing instructions that, when executed by one or more processors, control an image processing apparatus including at least one rotating optical fiber that rotates about an axis of rotation and that emits light towards a surface and at least two stationary fibers having a known predetermined position relative to each other and to the axis of rotation of the at least one rotating optical fiber, for detecting light reflected from the surface to
detecting an intensity of light reflected from the surface and which is transmitted through at least two stationary fibers within a given time interval, wherein each of the at least two stationary fibers have a known predetermined position relative to each other and to the axis of rotation of the at least one rotating optical fiber; and
using the detected intensities and the known predetermined positions of each of the at least two stationary fibers to determine a relative angular position of the rotating optical fiber with respect to the at least two stationary fibers.

* * * * *